(12) United States Patent
Pellen et al.

(10) Patent No.: US 10,838,526 B2
(45) Date of Patent: Nov. 17, 2020

(54) MANIPULABLE OBJECT AND HOLDER FOR MANIPULABLE OBJECTS

(71) Applicant: Orange, Paris (FR)

(72) Inventors: Nicolas Pellen, Chatillon (FR); Christian Gregoire, Chatillon (FR); Philippe Levasseur, Chatillon (FR); Pascal Le Mer, Chatillon (FR); Benoit Vuillemin, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/341,716

(22) PCT Filed: Oct. 2, 2017

(86) PCT No.: PCT/FR2017/052696
§ 371 (c)(1),
(2) Date: Apr. 12, 2019

(87) PCT Pub. No.: WO2018/069599
PCT Pub. Date: Apr. 19, 2018

(65) Prior Publication Data
US 2020/0050291 A1     Feb. 13, 2020

(30) Foreign Application Priority Data

Oct. 14, 2016   (FR) ..................... 16 59990

(51) Int. Cl.
*G06F 3/039*    (2013.01)
*A63F 13/2145*  (2014.01)
(Continued)

(52) U.S. Cl.
CPC ........ *G06F 3/0393* (2019.05); *A63F 13/2145* (2014.09); *A63F 13/98* (2014.09); *G06F 3/03547* (2013.01)

(58) Field of Classification Search
CPC .... G06F 3/03547; G06F 3/0362; G06F 3/039; G06F 3/0393
See application file for complete search history.

(56) References Cited

U.S. PATENT DOCUMENTS

| 4,951,036 A | * | 8/1990 | Grueter | .................. G06F 3/033 178/18.01 |
| 9,310,901 B2 | * | 4/2016 | Wussler | ................ G06F 3/0362 |

(Continued)

FOREIGN PATENT DOCUMENTS

EP   2187290 A1   5/2010

OTHER PUBLICATIONS

International Search Report dated Jan. 16, 2018 for corresponding International Application No. PCT/FR2017/052696, filed Oct. 2, 2017.

(Continued)

*Primary Examiner* — Gene W Lee
(74) *Attorney, Agent, or Firm* — David D. Brush; Westman, Champlin & Koehler, P.A.

(57) ABSTRACT

Objects are provided that can be manipulated relative to a touch-sensitive surface, in particular game pieces or buttons for interacting with a touch screen. A manipulable includes at least one lug enabling an interaction with the touch-sensitive surface; and a slot suitable for inserting the manipulable object on a holder that can be positioned relative to the touch-sensitive surface. The placement of the slot over the height of the manipulable object is suitable for keeping the at least one lug of the manipulable object in interaction with the touch-sensitive surface. Thus, the manipulable object allows the touch-sensitive surface to be interacted with at any time without any interaction errors, regardless of the position of this touch-sensitive surface relative to the horizontal. The touch-sensitive surface identifies any interaction (at a point or sliding) of the manipu- (Continued)

lable object and a non-erroneous location of this interaction on the tactile surface.

16 Claims, 5 Drawing Sheets

(51) Int. Cl.
*A63F 13/98* (2014.01)
*G06F 3/0354* (2013.01)

(56) References Cited

U.S. PATENT DOCUMENTS

| | | | |
|---|---|---|---|
| 9,910,515 B2* | 3/2018 | Richards | G06F 3/039 |
| 10,318,078 B2* | 6/2019 | Okuzumi | G05G 1/105 |
| 2006/0007179 A1* | 1/2006 | Pihlaja | G06F 3/04886 |
| | | | 345/173 |
| 2006/0256090 A1 | 11/2006 | Huppi | |
| 2013/0249808 A1 | 9/2013 | Silk et al. | |
| 2013/0267322 A1 | 10/2013 | South | |
| 2014/0043264 A1* | 2/2014 | Kelley | G06F 21/34 |
| | | | 345/173 |
| 2018/0024649 A1* | 1/2018 | Uno | G06F 3/0362 |
| | | | 345/174 |

OTHER PUBLICATIONS

Written Opinion of the International Searching Authority dated Jan. 16, 2018 for corresponding International Application No. PCT/FR2017/052696, filed Oct. 2, 2017.

International Preliminary Report on Patentability and English translation of the Written Opinion dated May 14, 2019 for corresponding International Application PCT/FR20 17/052696, filed Oct. 2, 2017.

\* cited by examiner

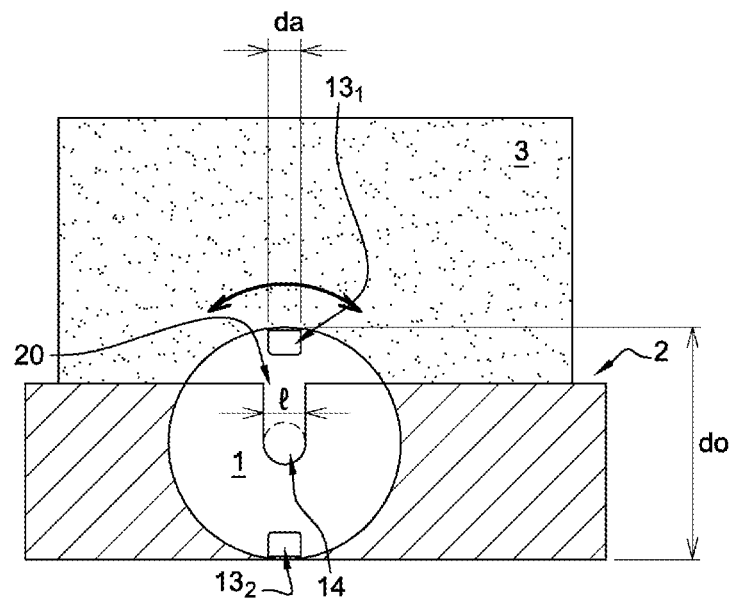
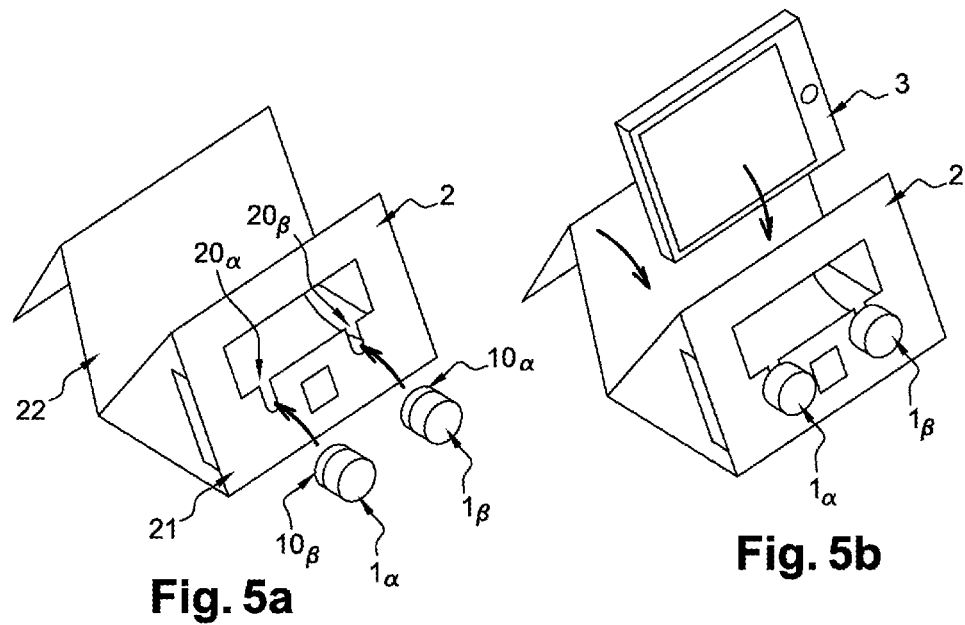

MANIPULABLE OBJECT AND HOLDER FOR MANIPULABLE OBJECTS

CROSS-REFERENCE TO RELATED APPLICATIONS

This Application is a Section 371 National Stage Application of International Application No. PCT/FR2017/052696, filed Oct. 2, 2017, the content of which is incorporated herein by reference in its entirety, and published as WO 2018/069599 on Apr. 19, 2018, not in English.

FIELD OF THE DISCLOSURE

The invention relates to objects that can be manipulated relative to a touch-sensitive surface, in particular game pieces or buttons for interacting with a touch screen.

BACKGROUND OF THE DISCLOSURE

These days, users can interact with touch screens by means of their own fingers but also according to the technologies used by the screens, by means of styluses or interactive game pieces (called keyPawn or iPawn or ePawn).

Game pieces were first introduced into the gaming field to introduce a third dimension in video games or bring the user friendliness of board games into games on tablets. Generally, interaction pieces make it possible to interact by means of the location of the game piece on the touch screen and/or a translational movement on the tablet. For a rotational interaction, in particular to interact with a circular interface such as circular menu or to modify the value of a parameter, the game piece slides over the screen and generally causes a rotational movement in addition to the rotational movement which is all the greater when the angle of rotation is great. The translational movement induced by rotation through the use of the game piece can lead to interaction errors.

That is why interaction buttons were dreamt up to make it possible to avoid these translational effects. In particular, these interaction buttons comprise a sucker that makes it possible to fix the button in a fixed position of the touch screen, in particular under a representation of a circular interface displayed by the touch screen, thus avoiding any translation of the button upon a rotation thereof by the user.

Nevertheless, when the touch screen is placed in a position other than horizontal, the game piece or the button will tend to slide on the screen, all the more so when the angle of the touch screen with the horizontal is significant. That will bring about new interaction errors. And even if the button is adapted to not change position on the screen, the part of the button allowing the interaction with the touch screen will tend to move away from the touch screen in the upper part of the rotation of the button, creating either interaction errors or absences of interaction according to the circular interface represented by the touch screen.

SUMMARY

One of the aims of the present invention is to remedy drawbacks of the state of the art.

A manipulable object of the invention is a manipulable object comprising:
   at least one lug allowing an interaction with a touch-sensitive surface, and
   a slot suitable for inserting the manipulable object onto a holder that can be positioned relative to the touch-sensitive surface, the location of the slot over the height of the manipulable object being suitable for keeping the at least one lug of the manipulable object interacting with the touch-sensitive surface.

Thus, the manipulable object makes it possible, at any moment, to interact without interaction errors with the touch-sensitive surface regardless of the position of this touch-sensitive surface relative to the horizontal: the touch-sensitive surface identifies any interaction (spot or sliding) of the manipulable object and an error-free location of this interaction on the touch-sensitive surface.

Advantageously, the at least one lug is conductive.

Thus, the manipulable object allows a precise interaction on a conductive touch-sensitive surface.

Advantageously, when the manipulable object comprises several lugs, the location of the slot is suitable for keeping all the lugs of the manipulable object interacting with the touch-sensitive surface.

Thus, the manipulable object allows all types of interaction, in particular sliding interactions requiring a displacement of the lugs such as rotation.

Advantageously, the slot is at a location over the height of the manipulable object suitable for keeping the lugs of the manipulable object in contact with the touch-sensitive screen.

Thus, the manipulable object makes it possible, at any moment, to interact without interaction errors with a touch-sensitive surface requiring, to interact, a contact regardless of the position of this touch-sensitive surface relative to the horizontal.

Advantageously, the location of the slot over the height of the manipulable object relative to a base of the manipulable object comprising the at least one lug and the slot is equal, when the holder is positioned on a touch-sensitive surface, to the distance between the holder and the touch-sensitive surface.

Thus, once the manipulable object is inserted, by virtue of its slot, onto the holder positioned on a touch-sensitive surface, the holder presses the lugs of the manipulable object against the touch-sensitive surface keeping the manipulable object in contact with the touch-sensitive surface.

Advantageously, the manipulable object comprises two bases of which one comprises the lugs and a slot whose location over the height of the manipulable object divides the manipulable object into two parts, each part comprising a base.

Thus, a first part of the object is suitable for interaction with the touch-sensitive surface, the part with the lugs, the second part is suitable for manipulation by a user wanting to interact with the touch-sensitive surface, and the slot makes it possible to insert the manipulable object onto a holder in order to place the manipulable object interaction with the touch-sensitive surface regardless of the position of the touch-sensitive surface relative to the horizontal.

Advantageously, the manipulable object comprises, on one and the same base, two lugs making it possible to control a rotation of an interaction element of a virtual interface that can be controlled by means of the touch-sensitive surface.

Thus, the manipulable object simulates two fingers of a hand to interact with the touch-sensitive surface.

Advantageously, the slot encircles the manipulable object.

Thus, the manipulable object can be inserted onto a holder regardless of its position relative to the holder provided that at least one lug is positioned facing the touch-sensitive surface. Furthermore, the manipulable object remains inserted on the holder regardless of the manipulation thereof, particularly in case of rotation.

Advantageously, the manipulable object is of cylindrical form and the at least one lug is placed under one of the bases of the cylinder.

Thus, a movement, such as a rotation, of the manipulable object relative to the touch-sensitive surface is less jerky because the user will have to modify the position of his or her hand on the object only to the maximum twist of his or her wrist and to reposition his or her fingers on each new face of the manipulable object.

Advantageously, the form of the manipulable object inside the slot is cylindrical.

Thus, a movement, such as a rotation, of the manipulable object relative to the touch-sensitive surface is less jerky because the cylindrical form of the form of the axis of the object (form inside the slot) eliminates the jerks associated with the change of face of an axis having several faces (axis of parallelepipedal, prismatic or other such form).

A subject of the invention is also a holder of manipulable objects relative to a touch-sensitive surface, the holder being able to be positioned relative to a touch-sensitive surface and being suitable for keeping at least one lug of at least one manipulable object with a slot inserted on the holder interacting with the touch-sensitive surface.

Thus, the holder makes it possible, at any moment, for a manipulable object inserted thereon to interact without interaction errors with the touch-sensitive surface regardless of the position of this touch-sensitive surface relative to the horizontal: the touch-sensitive surface identifies any interaction (spot or sliding) of the manipulable object and an error-free locating of this interaction on the touch-sensitive surface.

Advantageously, the holder of manipulable objects comprises at least one notch into which the slot of a manipulable object can be inserted.

Thus, for rotational interactions of the manipulable object, the notch avoids a lateral sliding of the manipulable object and therefore an interaction error with the touch-sensitive surface.

Advantageously, the width of the notch is at least equal to the dimension of the manipulable object inside the slot and less than the dimension of the manipulable object outside the slot.

Thus, the notch complements the slot to prevent the manipulable object from not remaining in contact with the touch-sensitive surface since, to remove the holder from the slot, the object first has to be removed from the notch.

Advantageously, the holder of manipulable objects comprises at least a front part and a rear part cooperating to keep the holder on the touch-sensitive surface regardless of the position of the touch-sensitive surface.

Thus, the holder is sufficient in itself to hold itself and hold the manipulable object on the touch-sensitive surface regardless of the position of the touch-sensitive surface.

Advantageously, the holder of manipulable objects also keeps the touch-sensitive surface in a determined position.

Thus, the use of the touch-sensitive surface in a position other than the horizontal position is possible without a support in addition to the holder of manipulable objects.

BRIEF DESCRIPTION OF THE DRAWINGS

The features and advantages of the invention will emerge more clearly on reading the description, given by way of example, and the figures relating thereto which represent:

FIGS. 4a, 4b, 4c and 4d, a simplified diagram of a manipulable object and of a holder according to the invention, in the case of an object with a slot completely encircling the object, respectively a side view and a front view for an object of cylindrical form, a front view for a cubic object, a front view for a parallelepipedal object, a front view for a holder with a notch;

FIGS. 5a, 5b and 5c, a simplified diagram of a holder of manipulable objects according to the invention, respectively before and after the insertion of two manipulable objects according to the invention, and a side view;

DETAILED DESCRIPTION OF ILLUSTRATIVE EMBODIMENTS

Figure 1A:
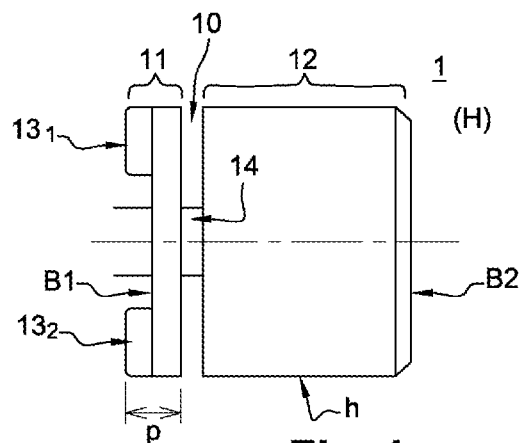
FIGS. 1a, 1b and 1c, a simplified diagram of a manipulable object according to the invention, respectively a side view, and underside view and a three-dimensional view, in the case of an object of cylindrical form.
Figure 1B:
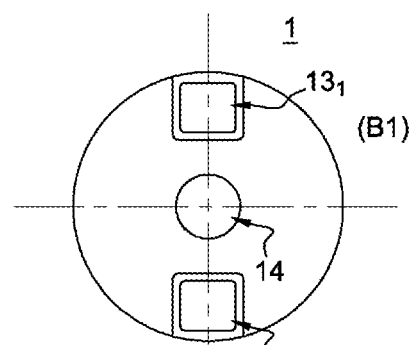
Figure 1C:
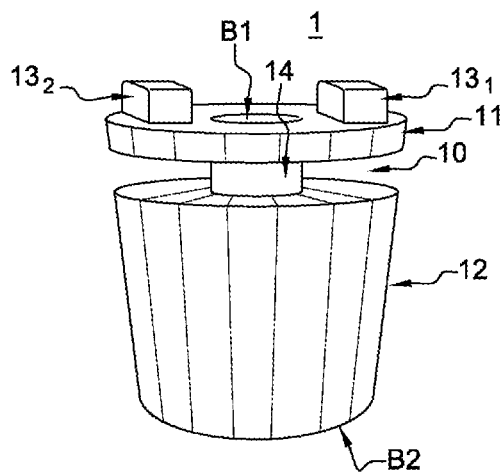
Figure 2A:
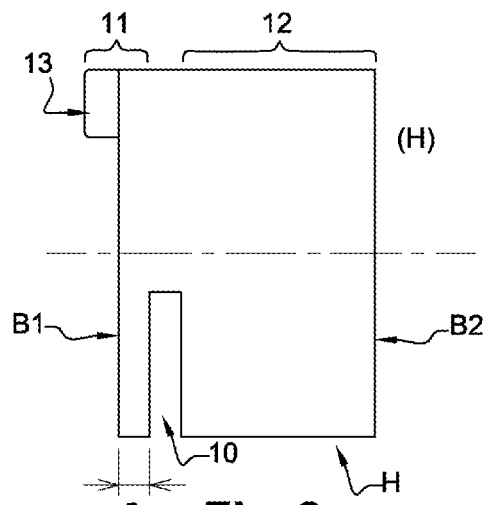
FIGS. 2a, 2b and 2c, a simplified diagram of a manipulable object according to the invention, respectively a side view, and underside view and a three-dimensional view, in the case of an object of prismatic form.
Figure 2B:
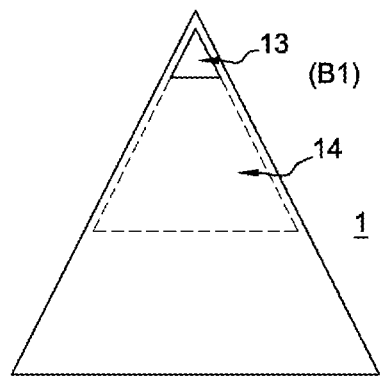
Figure 2C:
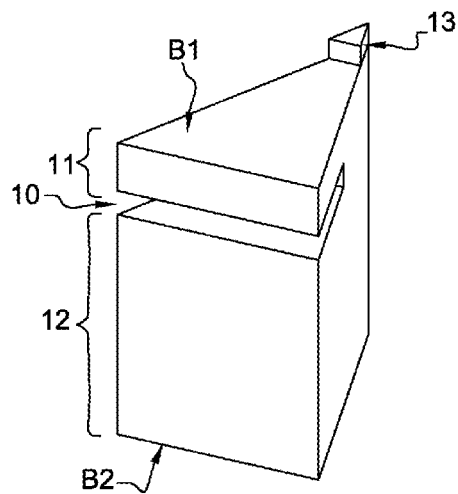

A manipulable object can have various forms comprising at least a base:
  either simple forms, such as a cylindrical form as shown in FIGS. 1a, 1b and 1c, a prismatic form as shown in FIGS. 2a, 2b and 2c but also cubic, slab, hemispherical, etc.,
  or complex forms, that is to say made up of at least two distinct forms: a hemisphere on a flat cylinder, a person on a slab, etc.

FIGS. 1a, 1b and 1c illustrate a simplified diagram of a manipulable object according to the invention, respectively a vertical cross-sectional view, a horizontal cross-sectional view and a three-dimensional view, in the case of an object of cylindrical form.

FIGS. 2a, 2b and 2c illustrate a simplified diagram of a manipulable object according to the invention, respectively a vertical cross-sectional view, a horizontal cross-sectional view and a three-dimensional view, in the case of an object of prismatic form.

The manipulable object 1 comprises:
  at least one lug 13, $13_1$, $13_2$ allowing an interaction with a touch-sensitive surface, and
  a slot 10 suitable for inserting the manipulable object 1 onto a holder that can be positioned relative to the touch-sensitive surface, the location p of the slot 10 over the height H of the manipulable object 1 being suitable for keeping the at least one lug 13 of the manipulable object 1 interacting with the touch-sensitive surface.

In the example of FIGS. 1a, 1b and 1c, the manipulable object 1 comprises two lugs $13_1$ and $13_2$. These lugs $13_1$ and $13_2$ are placed symmetrically on one of the bases B1 of the manipulable object 1. In the example of FIGS. 2a, 2b and 2c, the manipulable object 1 comprises a single lug 13. The lugs 13, $13_1$, $13_2$ can also be placed non-symmetrically.

In particular, the at least one lug $13_1$ and $13_2$ is conductive.

In particular, when the manipulable object 1 comprises several lugs as in FIGS. 1a, 1b and 1c, the location p of the slot 10 is suitable for keeping all the lugs $13_1$ and $13_2$ of the manipulable object 1 interacting with the touch-sensitive surface.

In particular, the slot 10 is at a location p over the height H of the manipulable object 1 suitable for keeping the lugs $13_1$ and $13_2$ of the manipulable object 1 in contact with the touch-sensitive surface.

In particular, the location p of the slot 10 over the height H of the manipulable object 1 relative to a base B1 of the manipulable object 1 comprising the at least one lug $13_1$ and $13_2$, and the slot 10, is equal, when the holder is positioned on a touch-sensitive surface, to the distance d between the holder and the touch-sensitive surface.

In particular, the manipulable object 1 comprises:
two bases B1, B2, of which one B1 comprises the lugs 13, $13_1$, $13_2$ and
a slot 10 whose location p over the height H of the manipulable object 1 divides the manipulable object 1 into two parts 11, 12, each part 11, 12 comprising a base B1, B2.

In particular, as in the example of FIGS. 1a, 1b and 1c, the manipulable object 1 comprises, on one and the same base B1, two lugs $13_1$, $13_2$ making it possible to control a rotation of an interaction element of a virtual interface that can be controlled by means of the touch-sensitive surface.

In particular, as in the example of FIGS. 1a, 1b and 1c, the slot 10 encircles the manipulable object as shown in FIG. 1c.

In particular, as in the example of FIGS. 1a, 1b and 1c, the manipulable object 1 is of cylindrical form and the at least one lug $13_1$, $13_2$ is placed under one of the bases B1 of the cylinder.

In particular, as in the example of FIGS. 1a, 1b and 1c, the form of the manipulable object inside the slot 14 is cylindrical.

FIGS. 1a, 1b and 1c are several views of one and the same example of manipulable object 1 of simple cylindrical form. FIG. 1a presents a side view H, that is to say a view on which a height h of the manipulable object 1 can be seen. The manipulable object 1 is a cylinder divided into two parts 11 and 12 by a slot 10 encircling the cylinder freeing a central axis 14, also cylindrical. Each part 11, 12 has a base, respectively B1, B2. The two bases B1, B2 are parallel. The manipulable object 1 comprises two lugs $13_1$, $13_2$ placed on the same base B1.

FIG. 1b presents an underside view of the manipulable object 1 of FIG. 1a. The circular edge of the cylinder forming the manipulable object 1 can be seen therein. Furthermore, represented therein are the two lugs $13_1$ and $13_2$ placed, symmetrically, on the periphery of the circle forming a base B1, and, transparently, the axis 14 left at the center of the slot 10. Thus, the two lugs $13_1$, $13_2$ make it possible to simulate the interaction of two fingers with the touch-sensitive surface and therefore rotational gestures on a touch-sensitive surface (like the action on a potentiometer for controlling volume, the selection of an element in a circular menu, the selection of a frequency, of a radio, etc., on a scale or in a list, etc.)

FIG. 1c shows a three-dimensional side view of the manipulable object 1 of FIGS. 1a and 1b.

FIGS. 2a, 2b and 2c are several views of one and the same example of manipulable object 1 of simple, prismatic, form. FIG. 2a presents a side view H, that is to say a view on which a height h of the manipulable object 1 can be seen. The manipulable object 1 is a prism divided into two parts 11 and 12 by a slot 10 on one of the sides of the prism. Each part 11, 12 has a base, respectively B1, B2. The two bases B1, B2 are parallel. The manipulable object 1 comprises a lug 13 placed on the base B1.

FIG. 2b presents an underside view of the manipulable object 1 of FIG. 2a. The triangular edge of the prism forming the manipulable object 1 can be seen therein. Furthermore, represented therein is the lug 13 placed on the periphery of the triangle forming a base B1, and, transparently, the remaining part 14 of the manipulable object 1 left by the slot 10.

FIG. 2c shows a three-dimensional side view of the manipulable object 1 of FIGS. 2a and 2b on which can be seen the slot 10 in a first side and rising over a part of the other two sides of the prism forming the manipulable object 1.

In an embodiment that is not illustrated, the two bases comprise lugs: for example, a single lug on one of the bases for translational interactions, and two lugs on the other base for rotational interactions. Either, the manipulable object 1 comprises a single slot 10. In this case, the height of the object is such that the location of the slot relative to the two bases is identical, thus making it possible to insert the object onto a holder in a one direction or the other depending on the desired interaction mode: translation, rotation, etc. Or, the manipulable object 1 comprises two slots 10. The location of each slot relative to its nearest base is such that the manipulable object can be inserted onto a holder in one direction or the other depending on the desired interaction mode: translation, rotation, etc.

Figure 3A:
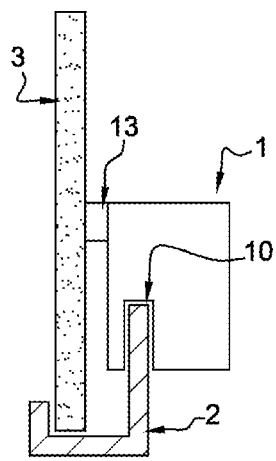
FIGS. 3a and 3b, a simplified diagram of a manipulable object and of a holder according to the invention, in the case of an object with a slot on a side of the object, respectively a side view and a front view.
Figure 3B:
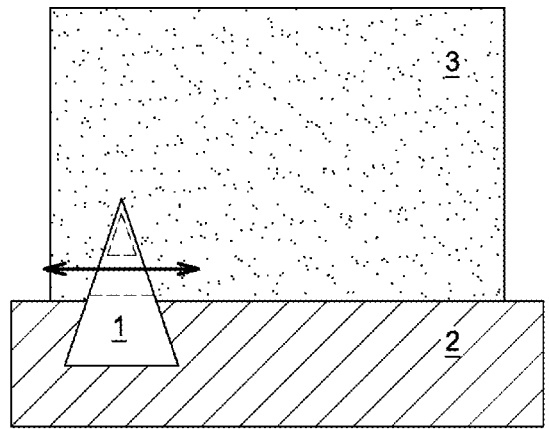

FIGS. 3a and 3b illustrate a simplified diagram of a manipulable object and of a holder according to the invention, in the case of an object with a slot on a side of the object, respectively seen in cross section and from the front, such as that represented by FIGS. 2a, 2b and 2c.

The manipulable object 1 comprises:
a lug 13 allowing an interaction with a touch-sensitive surface 3, and
a slot 10 suitable for inserting the manipulable object 1 onto a holder 2 that can be positioned relative to the touch-sensitive surface 3.

The location of the slot 10 over the height of the manipulable object 1 is suitable for keeping the lug 13 of the manipulable object 1 interacting with the touch-sensitive surface 3.

In particular, the lug 13 is conductive.

In particular, the slot 10 is at a location over the height of the manipulable object 1 suitable for keeping the lug 13 of the manipulable object 1 in contact with the touch-sensitive surface 3.

In particular, the location of the slot 10 over the height of the manipulable object 1 relative to a base of the manipulable object 1 comprising the lug 13, and the slot 10, is equal, when the holder 2 is positioned on a touch-sensitive surface 3, to the distance d between the holder 2 and the touch-sensitive surface 3.

FIGS. 3a and 3b are two views of one and the same example of manipulable object 1 of simple form: a prism inserted onto a holder 2 positioned relative to a touch-sensitive surface 3. FIG. 3a presents a side view H, that is to say a view on which a height of the manipulable object 1 can be seen. The manipulable object 1 is a prism divided into two parts by a slot 10 on one of the sides of the prism. Each part comprises a base. The two bases are parallel. The manipulable object 1 comprises a lug 13 placed on one of the bases.

The holder 2 of manipulable objects relative to a touch-sensitive surface can be positioned relative to a touch-sensitive surface 3 and is suitable for keeping at least one lug 13 of at least one manipulable object 1 of which a slot 10 is inserted onto the holder 2 interacting with the touch-sensitive surface 3.

In particular, FIG. 3a shows a holder 2 in the form of a gutter in which the touch-sensitive surface 3 is placed. At least one of the sides of the gutter 2 can be inserted into the slot 10 of the manipulable object 1. In particular, the thickness of this side of the holder 2 is less than or equal to the width of the slot 10. In particular, the holder 2 is produced in a material that is sufficiently rigid not to be deformed when it supports one or more manipulable objects.

FIG. 3b presents a front view of FIG. 3a, that is to say of the touch-sensitive surface 3 relative to which the holder 2 onto which the manipulable object 1 is inserted is positioned. The triangular edge of the prism forming the manipulable object 1 can be seen therein. Furthermore, represented therein transparently, are the lug 13 placed on the periphery of the triangle forming a base, and the remaining part 14 of the manipulable object 1 left by the slot 10. The manipulable object allows a translational interaction, for example selection of a volume, of a contrast, of a datum on a scale or in a horizontal list, etc.

FIGS. 4a, 4b, 4c and 4d illustrate a simplified diagram of a manipulable object and of a holder according to the invention, in the case of an object with a slot completely encircling the object, respectively seen in cross section, seen from the front for an object of cylindrical form, seen from the front for a cubic object, seen from the front for a parallelepipedal object, and seen from the front for a holder with a notch.

The manipulable object 1 comprises:
two lugs $13_1$, $13_2$ allowing an interaction with a touch-sensitive surface 3, and
at least one slot 10 suitable for inserting the manipulable object 1 onto a holder 2 that can be positioned relative to the touch-sensitive surface 3.

The location of the slot 10 over the height of the manipulable object 1 is suitable for keeping the lugs $13_1$, $13_2$ of the manipulable object 1 interacting with the touch-sensitive surface 3. These lugs $13_1$ and $13_2$ are placed symmetrically on one of the bases of the manipulable object 1.

In particular, the lugs $13_1$ and $13_2$ are conductive.

In particular, the slot 10 is at a location over the height of the manipulable object 1 suitable for keeping the lugs $13_1$ and $13_2$ of the manipulable object 1 in contact with the touch-sensitive surface.

In particular, the location of the slot 10 over the height of the manipulable object 1 relative to a base of the manipulable object 1 comprising the lugs $13_1$ and $13_2$, and the slot 10, is equal, when the holder 2 is positioned on a touch-sensitive surface 3, to the distance d between the holder and the touch-sensitive surface.

In particular, the manipulable object 1 comprises:
two bases, one of which comprises the lugs $13_1$, $13_2$ and a slot 10 whose location over the height of the manipulable object 1 divides the manipulable object 1 into two parts, each part comprising a base.

In particular, as in the example of FIGS. 4a to 4d, the manipulable object 1 comprises, on one and the same base, two lugs $13_1$, $13_2$ making it possible to control a rotation of an interaction element of a virtual interface that can be controlled by means of the touch-sensitive surface 3.

In particular, as in the example of FIGS. 4a to 4d, the slot 10 encircles the manipulable object 1.

Figure 4A:
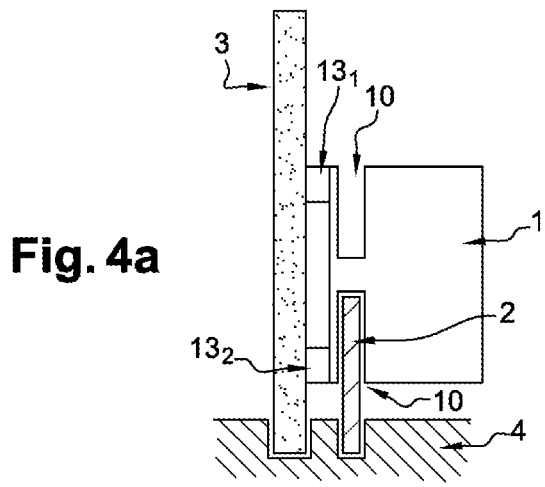
Figure 4B:
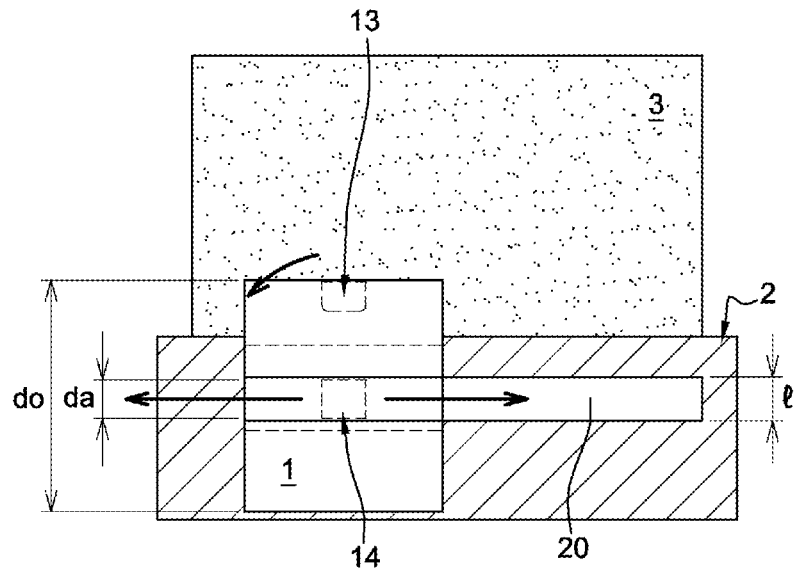

FIGS. 4a and 4b are several views of one and the same example of manipulable object 1 of simple cubic form. FIG. 4a presents a side view, that is to say a view on which a height of the manipulable object 1 can be seen. The manipulable object 1 is a cube divided into two parts 11 and 12 by a slot 10 encircling the cube freeing a central axis 14 which is also cubic, or two parallel slots. Each part comprises a base. The two bases are parallel. The manipulable object 1 comprises two lugs $13_1$, $13_2$ placed on the same base.

FIGS. 4a and 4b present a front view of the touch-sensitive surface 3 relative to which a holder 2 is positioned onto which the manipulable object 1 of FIG. 4a is inserted. The square edge of the cube forming the manipulable object 1 can be seen therein. Furthermore, represented therein are the two lugs $13_1$ and $13_2$ placed, symmetrically, on the periphery of the square forming a base, and, transparently, the axis 14 left at the center of the slot 10.

The manipulable object can be displaced by translation or by rotation allows the two types of interactions with the touch-sensitive surface. A cubic axis will avoid an inappropriate rotation leading to an interaction error.

In particular, as in the example of FIGS. 4a and 4b, the manipulable object 1 is of cylindrical form and the lugs $13_1$, $13_2$ are placed under one of the bases of the cube.

In particular, as in the example of FIGS. 4a and 4b, the form of the manipulable object inside the slot 14 is cylindrical.

The holder 2 of manipulable objects relative to a touch-sensitive surface can be positioned relative to a touch-sensitive surface 3 and is suitable for keeping at least one lug 13 of at least one manipulable object 1 of which a slot 10 is inserted onto the support 2 interacting with the touch-sensitive surface 3.

In particular, the holder 2 of manipulable objects takes the form of a rule of thickness less than or equal to the width of the slot 10 as shown in FIG. 4a. In particular the rule 2 is positioned on a touch-sensitive surface support 4, such as an a-frame, a box, etc. Optionally, the touch-sensitive surface support 4 comprises a location into which the touch-sensitive surface is inserted and a location making it possible to position another element, such as a protection filter, in front of the touch-sensitive surface in which the holder 2 of manipulable objects is positioned.

FIG. 4b shows a holder 2 of manipulable objects in the form either of two rules which are adjoined at their ends once inserted onto one or more manipulable objects, or one rule having a notch over the length of the rule. The notch can optionally be closed in order to stiffen the rule during the manipulation of the manipulable object.

In particular, as FIG. 4b shows, the holder 2 is composed of two parts onto which the slot or slots 10 of the manipulable object 1 are inserted.

Figure 4C:
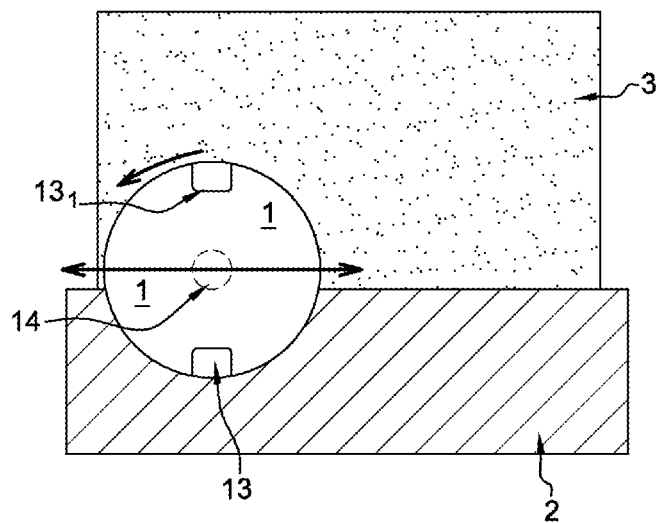

FIGS. 4a, 4c and 4d are several views of one and the same example of manipulable object 1 of simple cylindrical form. FIG. 4a presents a side view, that is to say a view on which a height of the manipulable object 1 can be seen. The manipulable object 1 is a cylinder divided into two parts 11 and 12 by a slot 10 encircling the cylinder freeing a central axis 14, also cylindrical. Each part comprises a base. The two bases are parallel. The manipulable object 1 comprises two lugs $13_1$, $13_2$ placed on the same base B1.

FIGS. 4c and 4d present a front view of the touch-sensitive surface 3 relative to which a holder 2 is positioned onto which the manipulable object 1 of FIG. 4a is inserted. The circular edge of the cylinder forming the manipulable object 1 can be seen therein. Also represented therein are the two lugs $13_1$ and $13_2$ placed, symmetrically, on the periphery of the circle forming a base, and, transparently, the axis 14 left at the center of the slot 10.

In particular, as FIG. 4d shows, the holder of manipulable objects 2 comprises at least one notch 20 into which the slot 10 of a manipulable object 1 can be inserted.

In particular, as FIG. 4d shows, the width I of the notch 20 is at least equal to the dimension da of the manipulable object 1 inside the slot 10 and less than the dimension do of the manipulable object outside the slot.

In an embodiment that is not illustrated, the holder 2 of manipulable objects is composed of two parts: a rigid part placed in front of the touch-sensitive surface 3 supporting the manipulable object or objects 1, and an elastic part continuing the rigid part at two of its ends behind the touch-sensitive surface 3. Thus, the holder 2 of manipulable objects encircles the touch-sensitive surface 3, self-supporting on the touch-sensitive surface regardless of its position. Furthermore, the elasticity of the rear part of the holder 2 of manipulable objects makes it possible to keep the object or objects into which the holder 2 of manipulable objects is inserted in contact with the touch-sensitive surface 3 regardless of its position.

Figure 5C:
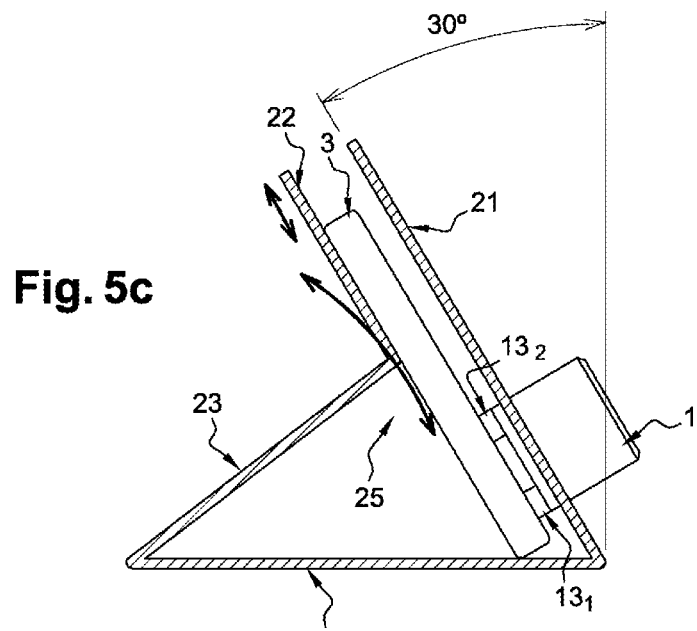

FIGS. 5a, 5b and 5c illustrate a simplified diagram of a holder of manipulable objects according to the invention, respectively before and after the insertion of two manipulable objects according to the invention, and a cross-sectional view.

The holder 2 of manipulable objects illustrated makes it possible to position two manipulable objects 1α and 1β in interaction with a touch-sensitive surface 3, in this case, a smartphone with touch screen.

In particular, the holder 2 of manipulable objects comprises at least a front part 21 and a rear part 22 that are cooperating to keep the holder 2 on the touch-sensitive surface 3 regardless of the position of the touch-sensitive surface 3.

In particular, the holder 2 of manipulable objects also keeps the touch-sensitive surface in a determined position.

In the example of FIGS. 5a, 5b, 5c, the holder 2 of manipulable objects comprises, in the part placed in front of the touch-sensitive surface 3, two notches 20α and 20β. The holder 2 is inserted at these two notches 20α and 20β into the slots of the manipulable objects 1α and 1β. Then, the touch-sensitive surface 3 is slid behind the front part 21. In order for the manipulable objects 1α and 1β to be kept interacting with the touch-sensitive surface 3, the rear part 22 is positioned behind the touch-sensitive surface 3 to hold the front part of the holder 2 on the touch-sensitive surface 3. The front part 21 and rear part 22, once closed, form a case for the touch-sensitive surface.

Optionally, in the case of a touch-sensitive surface not requiring contact to interact but simply a short distance from the touch-sensitive surface, the front part 21 will have a surface with shims which will be positioned between the front part 21 and the touch-sensitive surface 3 thus keeping the manipulable objects interacting with the touch-sensitive surface, particularly in the case of shadow interaction.

Furthermore, as FIGS. 5a, 5b and 5c show, the holder 2 of manipulable objects can be suitable for keeping the touch-sensitive surface in a position forming a given angle with the vertical. For example, a support 23 makes it possible to maintain position. The position of the support 23 relative to a piece of furniture on which it is placed makes it possible to determine the angle formed between the touch-sensitive surface and the vertical. In particular, the holder of manipulable objects 2 comprises this support 23. In order to stabilize the support 23, a rest 24 keeps the support 23 in a given position on a piece of furniture (not illustrated). Thus, the holder 2 of manipulable objects of FIGS. 5a, 5b and 5c has an a-frame composed of a part in contact with a piece of furniture 24, the rest, and a support part 23.

The space 25 remaining between the rear of the touch-sensitive surface 3 and the a-frame 23, 24 makes it possible, if necessary, to run useful cables to the touch-sensitive surface 3 (power supply cables, data transfer cables, etc.)

In particular, the holder 2 of manipulable objects is made of folded cardboard.

Figure 6A:
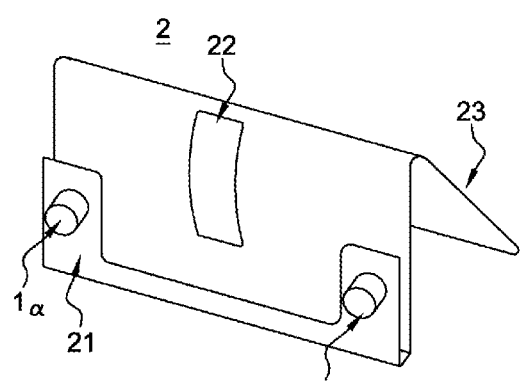
FIGS. 6a and 6b, a simplified diagram of a holder of manipulable objects making it possible to keep a touch-sensitive surface in position, respectively semi-vertical and vertical.
Figure 6B:
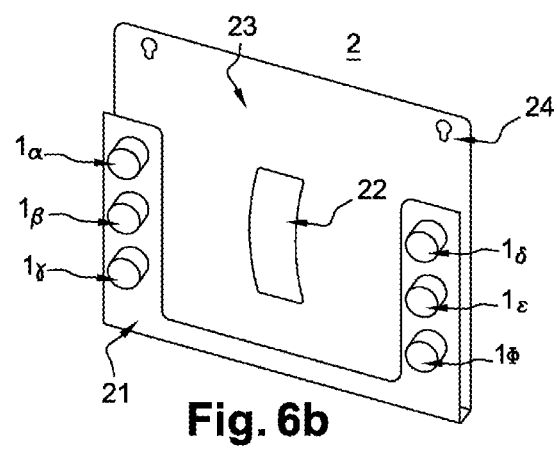

FIGS. 6a and 6b illustrate a simplified diagram of a holder of manipulable objects making it possible to keep a touch-sensitive surface in position, respectively semi-vertical and vertical.

The example of FIG. 6a shows a holder 2 of manipulable objects capable of keeping a touch-sensitive surface in semi-vertical position, that is to say a given angle with the vertical. In this example, the holder 2 of manipulable objects has a front part 21 only in the bottom part supporting two manipulable objects 1α and 1β. The rear part 22 comprises a spring-loaded tongue at its center. The front part 21 and rear part 22 form a dissymmetrical gutter whose rear part 22 is higher than the front part. The spring-loaded tongue of the rear part 22 presses a touch-sensitive surface placed in this gutter against the front part 21 making the manipulable objects into which the holder 2 is inserted with the touch-sensitive surface interact, even come into contact (in the absence of shims on the internal surface of the front part 21). In the example of FIG. 6a, the holder 2 of manipulable objects also comprises a support part 23 forming a fixed angle with the rear part, thus avoiding a variation of position of the touch-sensitive surface while it is being used.

The example of FIG. 6b shows a holder 2 of manipulable objects capable of keeping a touch-sensitive surface in vertical position. In this example, the holder 2 of manipulable objects has a front part 21 only in the bottom part supporting 6 manipulable objects 1α, 1β, 1χ, 1δ, 1ε and 1φ. The rear part comprises a spring-loaded tongue 22 at its center. The front part 21 and rear part form a dissymmetrical gutter whose rear part is higher than the front part. The manipulable objects 1α, 1β, 1χ, 1δ, 1ε and 1φ are placed on the sides of the front part rising up on the right and on the left. The spring-loaded tongue of the rear part 22 presses a touch-sensitive surface placed in this gutter against the front part 21 making the manipulable objects into which the support 2 is inserted with the touch-sensitive surface interact, even come into contact (in the absence of shims on the internal surface of the front part 21). In the example of FIG. 6a, the holder 2 of manipulable objects, the support part 23 merges with the rear part. This one support part 23 comprises notches 24 making it possible to fix the holder 2 of manipulable objects vertically on a piece of furniture or a wall.

Although the present disclosure has been described with reference to one or more examples, workers skilled in the art will recognize that changes may be made in form and detail without departing from the scope of the disclosure and/or the appended claims.

The invention claimed is:

1. An apparatus comprising:
   a holder, which is positionable relative to a touch-sensitive surface and comprises an edge having a thickness; and
   a manipulable object comprising:
      at least one lug allowing an interaction with the touch-sensitive surface, and
      a slot having a width that is greater than or equal to the thickness of the edge of the holder such that the manipulable object is insertable onto the edge of the holder in a first direction and removable from the edge of the holder in a second direction, opposite to the first direction, a location of the slot over a height of the manipulable object being suitable for keeping the at least one lug of the manipulable object interacting with the touch-sensitive surface.

2. The manipulable object as claimed in claim 1, wherein the at least one lug is conductive.

3. The manipulable object as claimed in claim 1, wherein, the manipulable object comprises several lugs, and the location of the slot is suitable for keeping all the lugs of the manipulable object interacting with the touch-sensitive surface.

4. The manipulable object as claimed in claim 1, wherein the location of the slot over the height of the manipulable object is suitable for keeping the at least one lug of the manipulable object in contact with the touch-sensitive surface.

5. The manipulable object as claimed in claim 1, wherein the location of the slot over the height of the manipulable object relative to a base of the manipulable object comprising the at least one lug and the slot is equal, when the holder is positioned on a touch-sensitive surface, to a distance between the holder and the touch-sensitive surface.

6. The manipulable object as claimed in claim 1, wherein the manipulable object comprises two bases of which one comprises the at least one lug and the slot whose location over the height of the manipulable object divides the manipulable object into two parts, each part comprising one of the two bases.

7. The manipulable object as claimed in claim 1, wherein the manipulable object comprises, on one and the same base, two lugs making it possible to control a rotation of an interaction element of a virtual interface that can be controlled by using the touch-sensitive surface.

8. The manipulable object as claimed in claim 1, wherein the slot encircles the manipulable object.

9. The manipulable object as claimed in claim 1, wherein the manipulable object is of cylindrical form and the at least one lug is placed under one of the bases of the cylindrical form.

10. The manipulable object as claimed in claim 9, wherein the form of the manipulable object inside the slot is cylindrical.

11. The apparatus as claimed in claim 1, wherein the holder comprises at least one notch along the edge into which the slot of a manipulable object can be inserted, the notch enabling translational movement of the manipulable object in the first and second directions and preventing translational movement of the manipulable object in directions perpendicular to the first and second directions.

12. The apparatus as claimed in claim 11, wherein a width of the notch is at least equal to a dimension of the manipulable object inside the slot and less than a dimension of the manipulable object outside the slot.

13. The apparatus as claimed in claim 1, wherein the holder comprises at least a front part and a rear part cooperating to keep the holder on the touch-sensitive surface regardless of a position of the touch-sensitive surface.

14. The apparatus as claimed in claim 1, wherein the holder also keeps the touch-sensitive surface in a determined position.

15. The apparatus as claimed in claim 1, wherein the slot of the manipulable object is slidable along the edge of the holder such that the manipulable object is translationally movable in a third direction, which is different from the first and second directions, to implement a translational interaction with the touch-sensitive surface.

16. The apparatus as claimed in claim 1, wherein the manipulable object is rotatable on the edge of the holder about an axis of rotation that is perpendicular to the first and second directions.

* * * * *